United States Patent [19]

Ling

[11] Patent Number: 5,179,509

[45] Date of Patent: Jan. 12, 1993

[54] HIGH-FREQUENCY AND HIGH-VOLTAGE POWER SUPPLY UNIT WITH INTERNAL PROTECTING CIRCUIT

[76] Inventor: Jackson Ling, 4 Fl., No. 3, Alley 18, Lane 792, Sec. 6, Chungshan N. Rd., Taipei, Taiwan

[21] Appl. No.: 781,030

[22] Filed: Oct. 21, 1991

[51] Int. Cl.⁵ .................................... H02M 5/458
[52] U.S. Cl. ............................ 363/17; 315/127; 315/226; 315/DIG. 7; 363/37; 363/56
[58] Field of Search ............... 363/37.17, 56, 143; 315/121, 127, 226, DIG. 7

[56] References Cited

U.S. PATENT DOCUMENTS

| | | | |
|---|---|---|---|
| 4,398,126 | 8/1983 | Zuchtriegel | 315/127 |
| 4,616,158 | 10/1986 | Krummel et al. | 315/225 |
| 4,712,170 | 12/1987 | Grace | 315/DIG. 7 |
| 4,870,326 | 9/1989 | Andresen et al. | 315/DIG. 7 |
| 5,081,399 | 1/1992 | Jy | 315/127 |
| 5,097,182 | 3/1992 | Kelly | 315/DIG. 7 |

*Primary Examiner*—William H. Beha, Jr.
*Attorney, Agent, or Firm*—Gifford, Groh, Sprinkle, Patmore and Anderson

[57] ABSTRACT

A high-frequency and high-voltage power supply unit with an internal protecting circuit includes a first DC power supply device, a second DC power supply device, a converting circuit, a sensing/holding circuit, and an amplifying circuit, where the DC power supply device incorporates with the converting circuit to generate high-frequency and high-voltage power to a neon light load. A wire is connected between a core of a third transformer and the sensing/holding circuit, and a pair of discharging tips disposed between the wire and one output terminal, such that when both output terminals disconnect from the load, a discharge occurs on the discharging tips, causing an impulse which is further fed back to the sensing/holding circuit through the amplying circuit cutting off the operation of the converting circuit. When only one output terminal disconnects from the load, an impulse is generated and fed back to the sensing/holding circuit through the amplying circuit, cutting off the operation of the converting circuit.

3 Claims, 2 Drawing Sheets

HIGH-FREQUENCY AND HIGH-VOLTAGE POWER SUPPLY UNIT WITH INTERNAL PROTECTING CIRCUIT

BACKGROUND OF THE INVENTION

This invention relates to a high-frequency and high-voltage power supply unit with an internal protecting circuit (hereinafter referred to as the power supply unit).

Neon lights require a high-voltage and high-frequency power supply unit, two wires being connected therebetween (see FIG. 2 of the drawings). The voltage could be as high as 10,000 volts and the frequency could be 25 KHz. Since neon lights are typically used outdoors, they are exposed to the elements such as rain and wind, which might damage or destroy the connection between the neon light and the power supply unit. This could easily result in an electrical leakage, possibly causing a fire or shocking passers-by. The wire disconnection between the power supply unit and the neon light arrangement has two situations: first, only one wire is is broken while the other wire still connected therebetween; second, the power supply unit is totally disconnected from the neon light arrangement, that is, two wires are disconnected therebetween.

SUMMARY OF THE INVENTION

The high-frequency and high-voltage power supply unit with an internal protecting circuit of the present invention provides high voltage (no-load, up to 15,000 volts; full-load up to 10,000 volts) when in regular operation and automatically turns off the power when the power supply is abruptly disconnected from the neon light.

It is an object of the present invention to provide a high-frequency and high-voltage power supply unit with an internal protecting circuit which can automatically turn off the power when a wire between the power supply and a neon light is disconnected abruptly.

It is another object of the present invention to provide a high-frequency and high-voltage power supply unit with an internal protecting circuit which can turn off the power when two wires between the power supply unit and the neon light are disconnected abruptly.

These and additional objects, if not set forth specifically herein, will be readily apparent to those skilled in the art from the detailed description provided hereunder, with appropriate reference to the accompanying drawings.

DETAILED DESCRIPTION OF THE PREFERRED EMBODIMENTS

Figure 1:
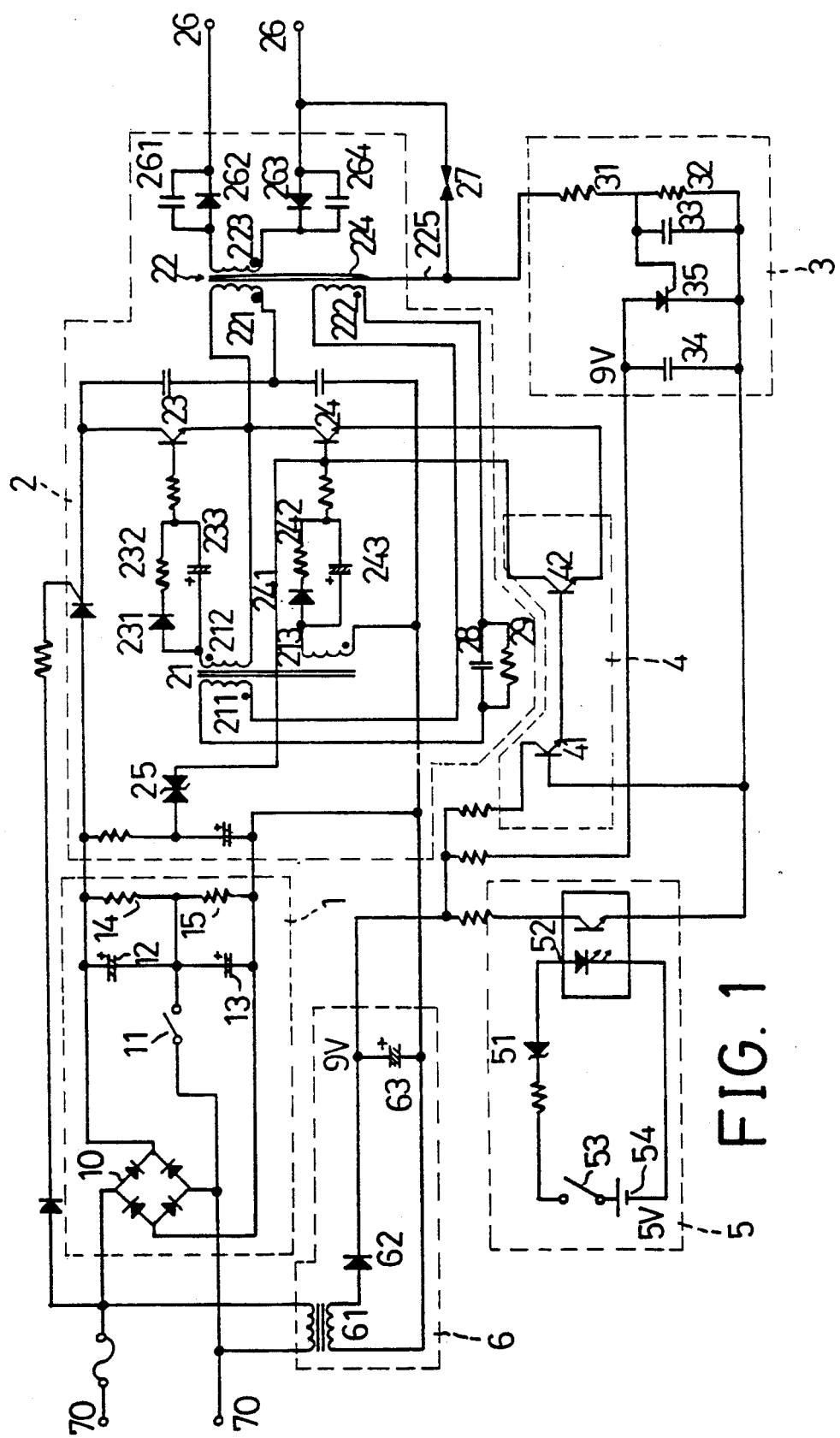
FIG. 1 is a schematic diagram of a circuit of the present invention.

Referring to FIG. 1, a high-frequency and high-voltage power supply unit in accordance with the present invention comprises a first DC power supply means 1, a converting circuit 2, a sensing/holding circuit 3, an amplifying circuit 4, a turn-off controlling circuit 5, and a second DC power supply means 6.

The first DC power supply unit 1 comprises a bridge rectifier 10 and a voltage-increasing unit comprising capacitors 12, 13 and resistors 14, 15, thereby generating a DC voltage up to 300 volts. An input AC power supply is applied to a pair of input terminals 70. A switch 11 disposed between the bridge rectifier 10 and the capacitors 12, 13 for adjusting to an input voltage. If the input voltage is 110-volt AC power, the switch 11 is pressed ON while a 220-volt AC power the switch 11 OFF.

The second DC power supply unit 1 comprises a first transformer 61 connected to a 110-volt AC power supply, a diode 62 for half-wave rectifying, a capacitor 63 for filtering and generating a 9-volt voltage therefrom. The detailed information of the power supply is conventional, therefore not being further described herein.

The converting circuit 2 comprises a diac 25, two power transistors 23, 24, a first transformer 21, and a second transformer 22. The first transformer 21 has a primary coil 211 and two secondary coils 212, 213. The second transformer 22 has two primary coils 221, 222 and a secondary coil 223. The 300-volt DC bias applies on the diac 25 and further actuates the power transistor 24 to be ON, which further outputs a current to the primary coil 221. Through a core 224 a magnetic flux is induced in another primary coil 222 and a current is fed back to primary coil 211 of the first transformer 21 which is coupled to the secondary coils 212, 213, actuating the power transistor 23 to be ON, cutting off the power transistor 24. The current from the power transistor 23 has an opposite polarity as that generated by the power transistor 24 previously, thereby causing an oscillation between the coils 221, 222. The oscillation of the two coils 221, 222 results a high-frequency and high-voltage AC voltage on the secondary coil 223. A pair of half-wave rectifiers are connected to two ends of the secondary coil 22 for obtaining a high-frequency and high-voltage output on the output terminals 26.

The core 224 of the secondary transformer 22 has a wire 225 connected to a sensing/holding circuit 3. A pair of discharging tips 27 are disposed between the output terminals 26 and the wire 225 for discharging when both ends of the output terminal are disconnected to the load (see FIG. 2).

The sensing/holding circuit 3 comprises series resistors 31, 32 for dividing the signal from the wire 225 to a smaller amplitude, a charging capacitor 33, and an SCR 35 with a gate connected to the charging capacitor 33 and an anode connected to a voltage of nine volts, such that when a strong signal from the wire 225 charges the capacitor 33, the SCR is triggered ON, further actuating the amplifier circuit 4.

The amplifier circuit 4 comprises a pair of Darlington transistors 41, 42. When the SCR 35 is triggered ON, the transistor 41 is actuated ON by a voltage passed from the SCR 35, which further actuates the transistor 42 to operate in a saturated status. The saturated voltage of transistor 42 is approximately 0.3 volt which further cuts off the transistor 24, terminating the oscillation between the coils 221 and 222, thereby cutting off the power supply.

Figure 2:
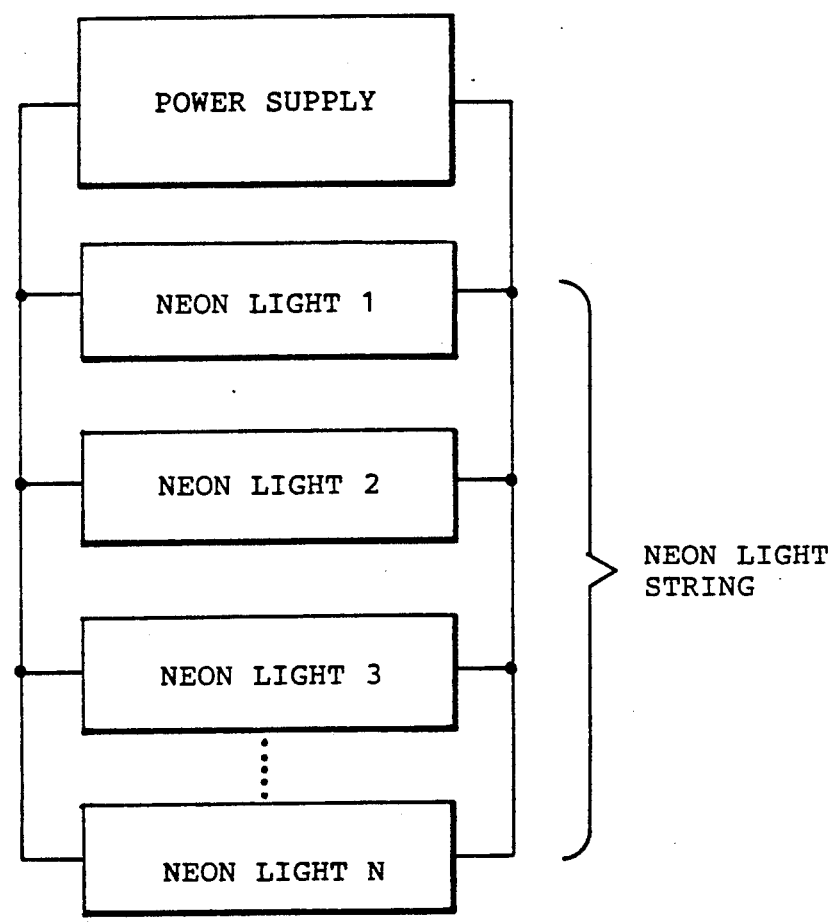
FIG. 2 is a schematic block diagram of a power supply unit connected to a neon light.

Referring to FIGS. 1 and 2, when both output terminals 26 of the power supply unit disconnect from the load, i.e. the neon light strings, the output voltage is increased from a full-load voltage of 10,000 volts to a no-load voltage of 15,000 volts, which enables the discharging tips 27 to break through an air insulator, discharging instantly. The immediate discharging causes an impulse generated and coupled to the sensing/holding circuit 3 via the wire 225. The impulse triggers the SCR 35, passing the 9-volt voltage through the SCR 35 and actuating the transistor 41 to be ON. This further actuates the transistor 42 to operate in a saturated status. The saturated voltage of the transistor 42 cuts off the power transistor 24 and stops the oscillation between the coils 221, 222, which cuts off the power supply unit.

When only one end of the output terminals 26 disconnects from the load with the other end still connected to the load, a magnetic field is induced and coupled to the load, causing an imbalance. An impulse signal is fed to the sensing/holding circuit 3 simultaneously, and also to the voltage dividing resistors 31, 32 and the charging capacitor 33, thereby triggering the SCR 35 to be ON and further actuating the transistor 41 and enabling the transistor 42 to operate in saturated status. The saturated voltage of the transistor 42 cuts off the transistor 24 and, in turn, stops the oscillation of the coils 221, 222, thereby turning of the power supply unit.

A manual cut-off circuit comprises a 5-volt (or 12-volt) DC power supply connected to a switch 53 and a driving circuit, such as a Zener diode 51, and is further connected to a photocoupler 52. When the switch 53 is pressed ON, the DC power 54 is coupled to the photocoupler 52, triggering the transistor 41 to be ON and further actuating the transistor 42 to operate in an saturated status, thereby turning off the power supply unit.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A high-frequency and high-voltage power supply unit with an internal protecting circuit comprising a first DC power supply means (1), a second DC power supply means (6), and converting circuit (2), a sensing-/holding circuit (3), and an amplifying circuit (4):

said first DC power supply means (1) for generating a DC voltage up to 300 volts comprising a bridge rectifier (10) and a voltage-increasing unit comprising capacitors (12, 13) and resistors (14, 15);

said second DC power supply means (6) for generating a 9-volt DC voltage comprising a first transformer (61) connected to an AC power supply, a diode (62) for half-wave rectifying, and a capacitor (63) for filtering;

said converting circuit (2) comprising a diac (25), two power transistors (23, 24), a first transformer (21), and a second transformer (22), said first transformer (21) having a primary coil (211) and two secondary coils (212, 213), said second transformer (22) having two primary coils (221, 222) and a secondary coil (223), said 300-volt DC bias is applied to said diac (25), said power transistor (24) is actuated ON which outputs a current to said primary coil (221) and through a core (224) a magnetic flux is induced in another primary coil (222) and a current is fed back to said primary coil (211) for said first transformer (21) and said current couples to said secondary coils (212 and 213) and actuates said power transistor (23) to be ON, cutting off said power transistor (24), said current from said power transistor (23) having opposite polarity as a current generated by said power transistor (24), thereby causing an oscillation between said coils (221 and 222), said oscillation of said coils (221 and 222) resulting a high-frequency and high-voltage AC voltage on said secondary coil (223), a pair of half-wave rectifiers being connected to two ends of said secondary coil (22) for obtaining a high frequency and high-voltage output on the output terminals (26);

said sensing/holding circuit (3) comprising a series of resistors (31, 32) for dividing a signal from a wire (225) to a smaller amplitude, a charging capacitor (33), a SCR (35) with a gate connected to said charging capacitor (33) and an anode connected to a voltage of approximately nine volts, such that when a strong signal from the wire (225) charges the capacitor (33), the SCR (35) is triggered ON and further actuates said amplifier circuit (4);

said amplifier circuit (4) comprising a pair of Darlington transistors (41, 42), said transistor (41) being actuated ON by a voltage passed from said SCR (35), which further actuates said transistor (42) to operate in a saturated status, a saturated voltage of said transistor (42) approximately equal to 0.3 volt further cutting off said transistor (24), terminating said oscillation between said coils (221 and 222) and cutting off said power supply unit, a core (224) of said secondary transformer (22) being connected with a wire (225) and further connected to said sensing/holding circuit (3), a pair of discharging tips (27) with air insulated therebetween disposed between said output terminals (26) and said wire (225) for discharging when both ends of said output terminals are disconnected from said load.

2. The high-frequency and high-voltage power supply unit with an internal protecting circuit as claimed in claimed 1, wherein said power supply unit is connected to a load with its output terminals (26) and when both output terminals (26) of said power supply unit disconnect from said load, said output voltage is increased from a full-load voltage of 10,000 volts to a no-load voltage of 15,000 volts, which enables said discharging tips (27) to break through said air to discharge instantly, and instant discharging causing an impulse which is generated and coupled to said sensing/holding circuit (3) via said wire (225), said impulse triggering said SCR (35) and passing said 9-volt voltage through said SCR (35) and actuating said transistor (41) ON, which further actuates said transistor (42) to operate in said saturated status, a saturated voltage of said transistor (42) cutting off said power transistor (24) and stopping said oscillation between said coils (221 and 222), which further cuts off said power supply unit; when only one of said output terminals (26) disconnects from said load, which causes said magnetic field coupled to said load to occur imbalance, inducing an impulse signal to be simultaneously fed to said sensing/holding circuit (3), thereby through said voltage dividing resistors (31, 32) and said charging capacitor (33), triggering said SCR (35) ON and further actuating said transistor (41) and enabling said transistor (42) to operate in said saturated status, a saturated voltage of said transistor (42) cutting off said transistor (24) and, in turn, stopping said oscillation of said coils (221, 222), thereby turning off said power supply unit.

3. The high-frequency and high-voltage power supply unit with an internal protecting circuit as claimed in claim 1, further comprising a manual cut-off circuit comprising a 5-volt (or 12-volt) DC power supply (54) connected to a switch (53) and to a driving circuit (51)

and further connected to a photocoupler (52), such that when said switch (53) is pressed ON, said DC power supply (54) is coupled to said photocoupler (52) and triggers said transistor (41) ON and further actuates said transistor (42) to operate in a saturated status, a saturated voltage of said transistor (42) cutting off said transistor (24), which, in turn, stops said oscillation of said coils (221, 222) and turns off said power supply unit.

* * * * *

UNITED STATES PATENT AND TRADEMARK OFFICE
CERTIFICATE OF CORRECTION

PATENT NO. : 5,179,509

DATED : January 12, 1993

INVENTOR(S) : Jackson Ling

It is certified that error appears in the above-identified patent and that said Letters Patent is hereby corrected as shown below:

On the title page, In the Abstract, line 13, "dischraging" should read --discharging--.

Column 3, line 62, Claim 1, "for" should read --of--.

Signed and Sealed this

Fourteenth Day of December, 1993

Attest:

BRUCE LEHMAN

*Attesting Officer*  *Commissioner of Patents and Trademarks*